US008625676B2

United States Patent
Au et al.

(10) Patent No.: US 8,625,676 B2
(45) Date of Patent: Jan. 7, 2014

(54) VIDEO BITSTREAM DECODING USING LEAST SQUARE ESTIMATES

(75) Inventors: Oscar Chi Lim Au, Hong Kong (CN); Zhiqin Liang, Hong Kong (CN)

(73) Assignee: Pai Kung Limited Liability Company, Wilmington, DE (US)

( * ) Notice: Subject to any disclaimer, the term of this patent is extended or adjusted under 35 U.S.C. 154(b) by 1316 days.

(21) Appl. No.: 12/147,545

(22) Filed: Jun. 27, 2008

(65) Prior Publication Data

US 2009/0003458 A1 Jan. 1, 2009

Related U.S. Application Data

(60) Provisional application No. 60/947,149, filed on Jun. 29, 2007.

(51) Int. Cl.
*H04N 7/26* (2006.01)

(52) U.S. Cl.
USPC ............ 375/240.25; 375/240.02; 375/240.03; 375/240.11; 375/240.18

(58) Field of Classification Search
USPC .................... 375/240–240.03, 240.1, 240.11, 375/240.18, 240.2, 240.24, 240.25
See application file for complete search history.

(56) References Cited

U.S. PATENT DOCUMENTS

| | | | |
|---|---|---|---|
| 7,634,794 B1 * | 12/2009 | Paik et al. ........................ | 725/62 |
| 2003/0009578 A1 * | 1/2003 | Apostolopoulos et al. ... | 709/231 |
| 2004/0102968 A1 * | 5/2004 | Tian et al. ...................... | 704/226 |
| 2005/0147163 A1 * | 7/2005 | Li et al. ..................... | 375/240.12 |
| 2005/0169387 A1 * | 8/2005 | Ratakonda et al. ........... | 375/243 |

OTHER PUBLICATIONS

Liang, "A Novel Multiple Description Approach to Predictive Video Coding", PCM 2007, LNCS 4810, pp. 286-295, Dec. 2007.*

* cited by examiner

*Primary Examiner* — Un C Cho
*Assistant Examiner* — Siming Liu
(74) *Attorney, Agent, or Firm* — Turocy & Watson, LLP

(57) ABSTRACT

System and methodologies are provided herein for reconstructing a video signal from multiple video streams. Various aspects described herein can utilize a least square estimate (LSE) algorithm to jointly decode multiple video bitstreams that are generated from a common original video sequence at different bit rates. As described herein, the LSE algorithm can reconstruct an original video sequence by determining and computing a weighted sum of collocated video information reconstructed from different video bitstreams. The weights applied can be adaptively determined to minimize the mean square error (MSE) of the reconstructed video sequence as compared to the original.

19 Claims, 9 Drawing Sheets

VIDEO BITSTREAM DECODING USING LEAST SQUARE ESTIMATES

CROSS-REFERENCE

This application claims the benefit of U.S. Provisional Patent Application Ser. No. 60/947,149, filed on Jun. 29, 2007, entitled "VIDEO TRANSCODING QUALITY ENHANCEMENT."

TECHNICAL FIELD

The subject disclosure relates generally to video signal processing, and more particularly to techniques for jointly decoding multiple video streams.

BACKGROUND

With the recent growth of the Internet and success of wireless network technology, the transmission of video signals has experienced a significant increase in popularity. However, most communication systems over which video signals are communicated are limited in storage and/or bandwidth capacity. Because raw video signals are often very large in size, such storage and/or bandwidth limits can render the transmission of raw video signals over such networks impracticable.

To nonetheless allow transmission of video signals over such networks, video signals can be distributed and stored in compressed format. For example, in video streaming applications, a server can generate compressed video bitstreams from a raw video signal for transmission to users. Multiple bitstreams may be generated, each with different bit rates corresponding to varying network conditions. Once the bitstreams are generated, the raw video signal can then be discarded due to storage limits. The bitstreams can then be transmitted to one or more users, after which the users can reconstruct the video signal from the received bitstreams. However, because video compression is a lossy process, the video signals reconstructed by each user will be distorted from the original raw video signal. Traditionally, when multiple bitstreams having different bit rates are available, this distortion is mitigated while reconstructing the original video by decoding the video bitstream with the highest bit rate. However, this traditional approach does not take into consideration all of the available data, such as data present in the bitstreams with lower bit rates, which could also be utilized to improve decoding performance. Accordingly, there exists a need in the art for techniques for reconstructing a video signal from video bitstreams with a higher degree of precision.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject disclosure provides systems and methodologies for improved video signal reconstruction and video stream decoding. In accordance with various aspects presented herein, a least square estimate (LSE) algorithm can be utilized to jointly decode multiple video bitstreams. By jointly decoding multiple video bitstreams, an original video signal reconstructed from the bitstreams can have significantly enhanced quality over a similar video signal reconstructed using traditional approaches.

In accordance with one aspect, a decoder can reconstruct discrete cosine transform (DCT) coefficients of a block in the original video signal by using a weighted superposition of corresponding DCT coefficients in co-located blocks reconstructed from multiple bitstreams. The weights applied to the DCT coefficients from the bitstreams can be adaptively determined to minimize the mean square error (MSE) of the coefficients. To facilitate this process, a quantization error model can also be used to track the MSE of the DCT coefficients in the bitstreams.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

DETAILED DESCRIPTION

Figure 1:
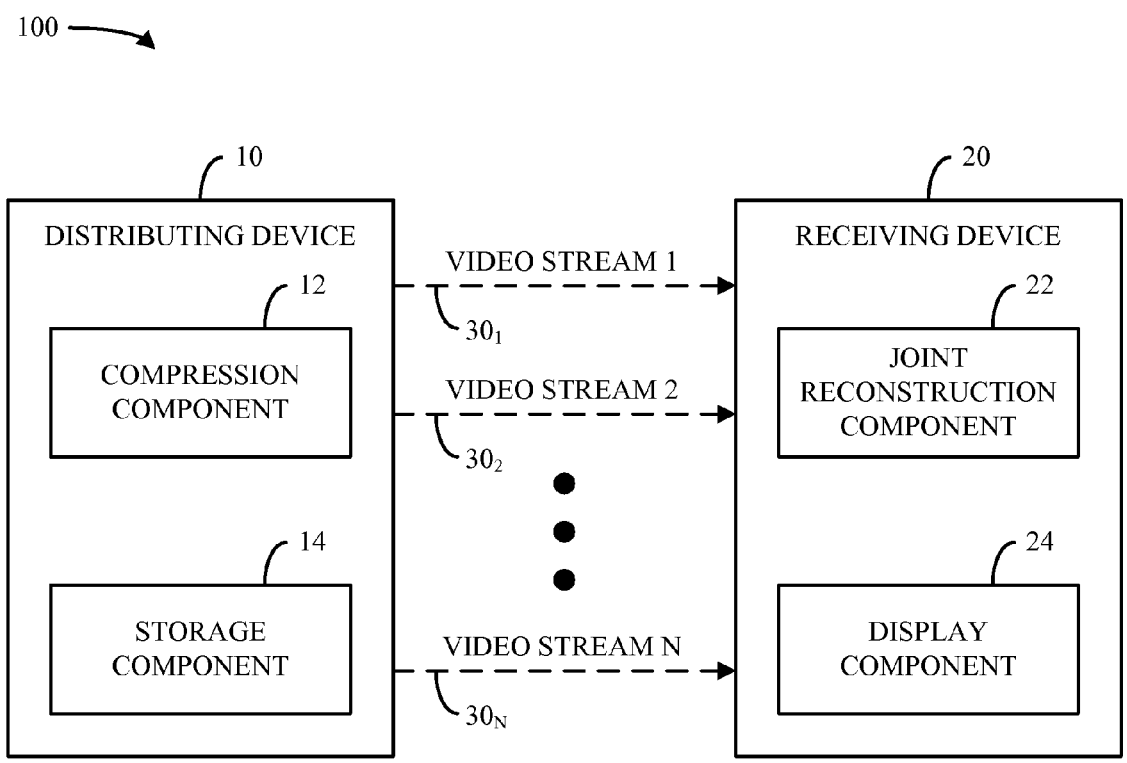
FIG. 1 is a high-level block diagram of a system for communicating and processing video streams in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Referring to the drawings, FIG. 1 illustrates a high-level block diagram of a system 100 for communicating and processing video streams 30 in accordance with various aspects presented herein. In one example, system 100 includes a distributing device 10 that can transmit video streams 30 of substantially identical content having different bit rates to a receiving device 20. While only one distributing device 10 and one receiving device 20 are illustrated in system 100 for simplicity, it should be appreciated that system 100 can include any number of distributing devices 10 and/or receiving devices 20, each of which can communicate video streams 30 to one or more devices 10 and/or 20 in system 100.

In another example, a compression component 12 can generate the video streams 30 by compressing a raw video signal into multiple bit rates. While the compression component 12 is illustrated in FIG. 1 as part of the distributing device 10, it should be appreciated that the compression component 12 can alternatively be external to the distributing device 10 and communicate generated video streams 30 to a storage component 14 and/or another appropriate component of the distributing device 10. In accordance with one aspect, the compression component 12 can generate video streams 30 of different bit rates from a common raw video signal to, for example, facilitate access to the video signal under varying network conditions. For example, a first receiving device 20 having a high bandwidth connection to the distributing device 10 can be configured to receive one or more video streams 30 with high bit rates from the distributing device 10, while a second receiving device 20 having a low bandwidth connection can instead be configured to receive video stream(s) 30 with lower bit rates. Alternatively, the video streams 30 can be generated by the compression component 12 in connection with varying levels or tiers of service provided by the distributing device 10 having corresponding monetary rates associated therewith. Once generated, the video streams 30 can be transmitted to a receiving device 20 and/or stored by the storage component 14 at the distributing device 10 for later transmission to a receiving device 20.

By way of non-limiting example, a distributing device 10 and a receiving device 20 can be communicatively connected via a wired (e.g., Ethernet, IEEE-802.3, etc.) or wireless (IEEE-802.11, Bluetooth™, etc.) networking technology. Additionally, a distributing device 10 and a receiving device 20 can be directly connected to one another or indirectly connected through a third party device (not shown). For example, a distributing device 10 can be a web server and a receiving device 20 can be a client computer that accesses the distributing device 10 from the Internet via an Internet service provider (ISP). As another example, a receiving device 20 can be a mobile terminal that accesses video streams 30 from the distributing device 10 via a cellular communication network such as the Global System for Mobile Communications (GSM), a Code Division Multiple Access (CDMA) communication system, and/or another suitable cellular communication network.

In accordance with one aspect, a raw video signal used by the compression component 12 to generate the video streams 30 can be discarded after the video streams are generated 30 due to storage limits at the distributing device 10. Thus, only the compressed video streams 30 generated from the original raw video signal may be available to the receiving device 20. In one example, the receiving device can obtain a video signal corresponding to one or more video streams 30 by reconstructing the video streams 30. However, because video compression (e.g. video compression employed by the compression component 12) is a lossy process, distortion can be present in a reconstructed video signal obtained by the receiving device 20.

To mitigate this distortion, a receiving device 20 can include a joint reconstruction component 22 that can jointly decode multiple video streams 30 generated from a common raw video signal having different bit rates to reconstruct the original video signal compressed by the compression component 12. In one example, the compression component 12 compresses a raw video signal into video streams 30 by utilizing a subset of information present in the raw signal and discarding the remainder. As the bit rate of a video stream 30 increases, the amount of information from the raw signal retained in the video stream 30 can likewise increase. However, due to varying quantization steps and other mechanisms that can be utilized by the compression component 12 to compress the raw signal into video streams 30, video streams 30 having different bit rates may include non-overlapping information from the original raw video signal. In accordance with one aspect, the joint reconstruction component 22 can utilize this non-overlapping information from multiple video streams 30 to jointly reconstruct a video signal using multiple video streams 30. By doing so, a video signal reconstructed by the joint reconstruction component 22 can have a higher quality than a video signal obtained by reconstructing any individual video stream 30. In one example, a video signal reconstructed by the joint reconstruction component 22 can then optionally be provided to a display component 24 at the receiving device 20 for display. The display component 24 and/or another suitable component associated with the receiving device 20 can additionally perform appropriate pre-processing operations on the reconstructed video signal prior to display, such as rendering, buffering, and/or other suitable operations.

Figure 2:
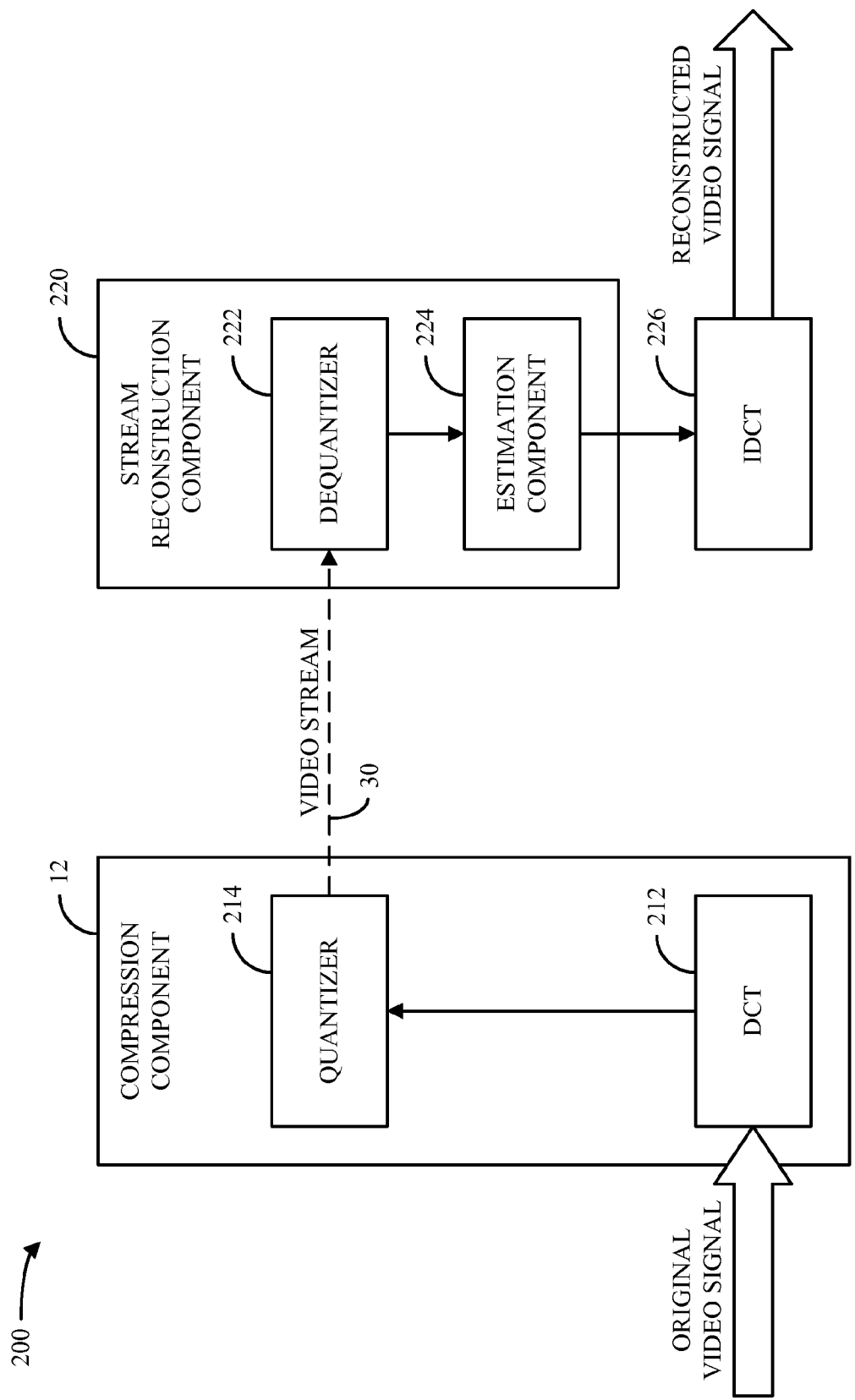
FIG. 2 is a block diagram of a system for compressing and reconstructing a video signal in accordance with various aspects.

Referring now to FIG. 2, a block diagram of a system 200 for compressing and reconstructing a video signal is illustrated. In accordance with one aspect, an original video signal can be received by a compression component 12. In one example, the original video signal can be a time domain signal that is composed of one or more two-dimensional frames, each of which can in turn be composed of a series of blocks. By way of specific, non-limiting example, blocks in the video signal can represent 8×8 pixel areas in the video signal and/or other suitable sizes and/or arrangements of pixels. As another specific, non-limiting example, the blocks in the video signal can include intra-coded blocks ("I-blocks"), which are generated based only on information located at the frame in which the block is located; inter-coded blocks ("prediction blocks" or "P-blocks"), which can be generated based on information in the current frame as well as immediately preceding and/or succeeding frames; and/or other types of blocks.

In accordance with one aspect, the compression component 12 can compress the original video signal by determining and truncating information in respective blocks present in the video signal that correspond to areas of low-frequency deviation between pixels. For example, the compression component can determine and truncate information corresponding to low-frequency deviation in color, intensity, and/or other appropriate measurements between pixels. To facilitate this process, the compression component 12 can convert the original video signal to the frequency domain by performing a discrete cosine transform (DCT) 212 on the original video signal.

In one example, after a DCT 212 is performed, each block in the transformed signal can have DCT coefficients corresponding to deviation frequencies between pixels in the block. These coefficients can include one DC coefficient, which represents an average value for the pixels in the block, and a set of AC coefficients that represent change through the pixels in the block at respective increasing frequencies. As used generally herein, a k-th frame in a video signal is denoted as $F_k$. Further, $x_i(F_k)$ is used to represent the i-th DCT coefficient in an original video signal, and $x_i(F_k, V_l)$ is used to represent the i-th DCT coefficient in a reconstructed video signal corresponding to an l-th video stream $V_l$.

In accordance with another aspect, respective blocks of a DCT-transformed video signal can be compressed by quantizing the blocks of the transformed signal using a quantizer 214 at the compression component 12. The quantized blocks can then be transmitted as a video stream 30 to a stream reconstruction component 220, which can dequantize the blocks using a dequantizer 222 in order to reconstruct the video signal from the video stream 30. As used herein, the expressions $Q(V,Q_p)$ and $DeQ(L,Q_p)$ respectively refer to a quantization mapping used by the quantizer 214 and a dequantization mapping used by the dequantizer 222. As used in the expressions, V represents input to the quantizer 214, L represents input to the dequantizer 222, and $Q_p$ represents a quantization step.

In one example, intra-coded blocks and inter-coded blocks can be quantized differently by the quantizer 214. Accordingly, quantization mappings used by the quantizer 214 for intra-coded blocks and inter-coded blocks are respectively expressed herein as $Q^I(V,Q_p)$ and $Q^P(V,Q_p)$. By way of specific example, the following quantization mappings may be used by the quantizer 214 to quantize the DCT coefficients of the converted original video signal:

$$Q(V, Q_p) = \begin{cases} Q^I(V, Q_p) & \text{if intracoded} \\ Q^P(V, Q_p) & \text{otherwise,} \end{cases} \quad (1)$$

$$Q^I(V, Q_p) = \text{floor}\left(\frac{|V|}{2Q_p}\right) \cdot \text{sign}(V), \quad (2)$$

$$Q^P(V, Q_p) = \text{floor}\left(\frac{|V| - Q_p/2}{2Q_p}\right) \cdot \text{sign}(V), \quad (3)$$

where floor(·) is used to round an input to the nearest integer that is smaller than the input and sign(·) is used to return the sign of the input. By way of further specific, non-limiting example, a quantization step of $Q_p=8$ may be used for the DC coefficient of intra-coded blocks.

In accordance with another aspect, quantized intra-coded and inter-coded blocks may be transmitted as a video stream 30 to the stream reconstruction component 220. Upon receiving the video stream 30, a dequantizer 222 at the stream reconstruction component 220 can then dequantize the blocks in the video stream 30. In one example, the dequantizer 222 can utilize the same dequantization mapping $DeQ(L,Q_p)$ to dequantize the DCT coefficients of the video stream 30 for both intra-coded and inter-coded blocks. This mapping can be expressed as follows:

$$DeQ(L, Q_p) = \begin{cases} Q_p \cdot (2 \cdot L + 1) & \text{if } Q_p \text{ is odd} \\ Q_p \cdot (2 \cdot L + 1) - 1 & \text{otherwise.} \end{cases} \quad (4)$$

Accordingly, based on Equations (1)-(4), a reconstructed signal corresponding to an input V generated by the dequantizer 222 at the stream reconstruction component 220 can be defined as follows:

$$\text{Rec}(V,Q_p) = DeQ(Q(V,Q_p),Q_p). \quad (5)$$

In one example, the dequantized signal generated by the dequantizer 222 has an associated degree of uncertainty. More particularly, for a particular reconstructed value $\tilde{v}$, multiple values of V may exist that could result in a dequantized value of $\tilde{v}$ (e.g., multiple values of V could satisfy $\text{Rec}(V,Q_p)=\tilde{v}$). Based on this uncertainty, a lower bound value $LB(\tilde{v},Q_p)$ and an upper bound value $UB(\tilde{v},Q_p)$ can be defined as the minimum and maximum values of V that satisfy $\text{Rec}(V,Q_p)=\tilde{v}$. As a result, with a quantization step of $Q_p$, if V is reconstructed to $\tilde{v}$ by the dequantizer 222, then the cell (or "range") of the original signal V can be expressed as follows:

$$V \in [LB(\tilde{v},Q_p), UB(\tilde{v},Q_p)]. \quad (6)$$

In one example, an intra-coded DCT coefficient $x_i(F_k)$ (e.g., a coefficient corresponding to an I-block) can be reconstructed by the dequantizer 222 as follows:

$$\tilde{x}_i(F_k, V_l) = \text{Rec}(x_i(F_k), Q_p). \quad (7)$$

Further, by way of specific, non-limiting example, the AC coefficients for a given I-block can conform to a zero-mean Laplacian probability distribution. The Laplacian probability density function (PDF) $f_{F_k,V_l}^i(x)$ for each coefficient in an I-block can be expressed as follows:

$$f_{F_k,V_l}^i(x) = \frac{1}{2\lambda_{F_k,V_l}^i} e^{-|x|/\lambda_{F_k,V_l}^i}, \quad (8)$$

where $\lambda_{F_k,V_l}^i$ is a rate parameter of the distribution of the i-th coefficient of frame $F_k$ in stream $V_l$. In one example, the rate parameter of the PDF $f_{F_k,V_l}^i(x)$ can be estimated by observing the distribution of $\tilde{x}_i(F_k,V_l)$.

Additionally and/or alternatively, an inter-coded DCT coefficient $x_i(F_k)$ (e.g., a coefficient corresponding to a prediction block) can be reconstructed by the dequantizer 222 as follows. First, the expression $p_i(F_{k-1},V_l)$ can be used to denote the i-th DCT coefficient of the prediction block generated by the previous frame $F_{k-1}$. The expression $r_i(F_k,V_l)$ can then be used to denote the i-th DCT coefficient of the residual signal, which can be obtained using the following equation:

$$x_i(F_k) = p_i(F_{k-1}, V_l) + r_i(F_k, V_l). \quad (9)$$

Based on the expressions $p_i(F_{k-1}, V_l)$ and $r_i(F_k, V_l)$ and Equation (9), the reconstructed version of the i-th DCT coefficient of the residual of an l-th stream $V_l$ can be expressed as follows:

$$\tilde{r}_i(F_k, V_l) = \text{Rec}(r_i(F_k, V_l), Q_p). \quad (10)$$

Based on Equations (9) and (10), an inter-coded DCT coefficient $r_i(F_k, V_l)$ can then be reconstructed by the dequantizer 222 as follows:

$$\tilde{x}_i(F_k, V_l) = p_i(F_{k-1}, V_l) + \tilde{r}_i(F_k, V_l). \quad (11)$$

By way of specific, non-limiting example, the distribution of $r_i(F_k, V_l)$ can also be Laplacian. Accordingly, the PDF for the distribution of $r_i(F_k, V_l)$ can be similar in form to Equation (8) with a different rate parameter. In one example, the rate parameter for the distribution of $r_i(F_k, V_l)$ can be obtained by observing the distribution of $\tilde{r}_i(F_k, V_l)$ in a similar manner to Equation (8) for the distribution of AC coefficients in an I-block.

In accordance with another aspect, the stream reconstruction component 220 can further include an estimation component 224. In one example, the estimation component 224 can obtain a minimum mean square error (MMSE) reconstruction of the original video signal by utilizing the distribution of DCT coefficients, the quantization step applied by the quantizer 214, and the upper and lower bounds for each coefficient to estimate reconstructed coefficients within the range for each coefficient that minimizes the mean square error (MSE) of the reconstructed video signal.

In one specific example, the estimation component can perform MMSE reconstruction using the Lloyd-Max method. As used herein, the abbreviated expression x is used in place of $x_i(F_k, V_l)$, which represents the i-th coefficient in a k-th frame $F_k$ of an l-th video stream $V_l$ 30. Accordingly, the estimation component 224 can utilize the Lloyd-Max method to determine an optimal reconstruction for an intra-coded block based on the following equation:

$$x_{opt} = \frac{\int_l^u xf(x)dx}{\int_l^u f(x)dx}, \quad (12)$$

where $l = LB(\tilde{x}, Q_p)$, $u = UB(\tilde{x}, Q_p)$, $Q_p$ is the size of the quantization step used by the quantizer 214, and $f(x)$ represents the distribution of the DCT coefficients of the block. Similarly, the estimation component 224 can determine an MMSE reconstruction of the residual portion of an inter-coded block by using the following equation:

$$r_{opt} = \frac{\int_{l'}^{u'} rf(r)dr}{\int_{l'}^{u'} f(r)dr} \quad (13)$$

where $l' = LB(\tilde{r}, Q_p)$, $u' = UB(\tilde{r}, Q_p)$, $Q_p$ is the size of the quantization step used by the quantizer 214, and $f(r)$ represents the distribution of the DCT coefficients of the residual block. Based on Equations (12) and (13), an optimal reconstruction of a video signal 30 as determined by the estimation component 224 can then be expressed as follows:

$$x_{opt} = p + r_{opt}. \quad (14)$$

In accordance with one aspect, upon reconstruction of a video signal 30 by the stream reconstruction component 220, an inverse DCT (IDCT) 226 can be performed on the reconstructed signal to convert the reconstructed signal back to the time domain. After conversion to the time domain via IDCT 226, the reconstructed video signal can be further processed and/or displayed by a receiving device (e.g., a receiving device 20).

In accordance with another aspect, the MSE of the reconstruction performed by the stream reconstruction component 220 for intra-coded blocks and inter-coded blocks in a video stream 30 can be expressed as $MSE_I(x_{opt})$ for intra-coded blocks and $MSE_P(x_{opt})$ for inter-coded blocks. Further, MSE for the respective types of blocks can be determined based on the following equations:

$$MSE_I(x_{opt}) = \int_l^u (x - x_{opt})^2 f(x)dx, \quad (15)$$

$$MSE_P(x_{opt}) = \int_{l'}^{u'} ((p+r) - (p+r_{opt}))^2 f(r)dx \quad (16)$$
$$= \int_{l'}^{u'} (r - r_{opt})^2 f(r)dx.$$

Figure 3:
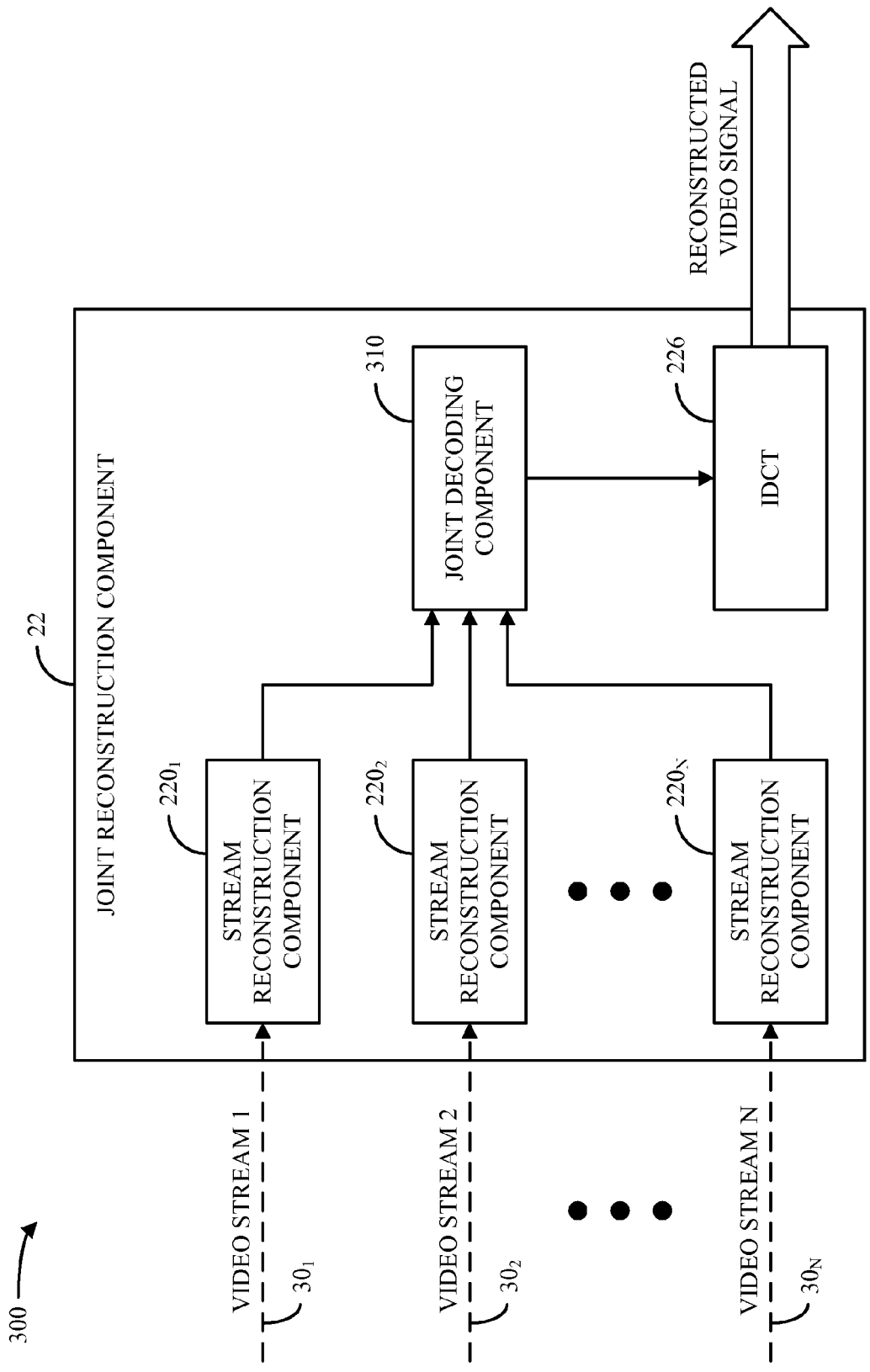
FIG. 3 is a block diagram of a system for reconstructing a video signal from multiple video streams in accordance with various aspects.

Turning to FIG. 3, a block diagram of a system 300 for reconstructing a video signal from multiple video streams 30 in accordance with various aspects is illustrated. In one example, system 300 includes a joint reconstruction component 22, which can be employed by a receiving device (e.g. a receiving device 20) and/or another suitable device. The joint reconstruction component 22 can obtain multiple video streams 30 (e.g., from a distributing device 10), each of which can be compressed from the same raw video signal at different bit rates. Each video stream can be initially processed by one or more stream reconstruction components 220 as generally described supra with regard to system 200. While system 300 illustrates a stream reconstruction component 220 corresponding to respective video streams 30, it should be appreciated that fewer stream reconstruction components 220 can be employed by the joint reconstruction component 22 and that respective stream reconstruction components 220 can individually and/or jointly process any number of video streams 30. For example, the joint reconstruction component 22 can contain a single stream reconstruction component 220 that initially processes all video streams 30. In accordance with one aspect, the reconstructed individual streams can then be provided to a joint decoding component 310, which can combine information from the reconstructed streams to reconstruct the raw video signal represented by the video streams 30. An IDCT 226 can then be performed on the jointly reconstructed video signal to convert the signal to the time domain for display and/or other processing.

In accordance with one aspect, the joint decoding component 310 can reconstruct a video signal from multiple video streams 30 by utilizing a least square estimate (LSE) criterion. In one example, LSE joint decoding can be performed by the joint decoding component 310 as follows. First, from n video streams 30 representing the same original video, which can be represented as $(V_1, \ldots, V_n)$, optimal DCT coefficients for each individual video stream 30 in the MMSE sense can be determined by respective stream reconstruction component(s) 220 using Equations (12) and (14).

As used herein, DCT coefficients corresponding to each video stream 30 are collectively referred to as x and the indices i are omitted. Accordingly, the joint decoding component 310 can receive a column vector $X_{MMSE} = (x_{opt1}, \ldots, x_{optn})^T$, which represents the MMSE reconstructions of the collocated DCT coefficients from video streams $(V_1, \ldots, V_n)$ as performed by the respective stream reconstruction component(s) 220. Additionally, the joint decoding component 310 can receive a column vector $\text{Err}=(e_1, \ldots, e_n)^T$ of random variables that represent the reconstruction error from each video stream 30. Based on these input vectors, the joint decoding component 310 can determine a least square estimate of an original video signal x as follows:

$$x_{LSE} = X_{MMSE}^T \cdot W, \quad (17)$$

where $W=(w_1, \ldots, w_n)$ represents a set of weights subject to the constraint $$\sum_{i=1}^{n} w_n = 1$$

that minimizes the following:

$$E[(x-x_{LSE})^2] = E[(\text{Err}^T \cdot W)^2] \quad (18)$$

The joint decoding component 310 can then determine the value of each weight $w_i$ by differentiating Equation (18) with respect to $w_i$ for $1 \leq i \leq n$ and solving the resulting n equations together with the constraint $$\sum_{i=1}^{n} w_n = 1.$$

In one example, the joint reconstruction component 22 can then generate a reconstructed video signal by combining each reconstructed stream according to their corresponding determined weights and performing an IDCT 226 on the result.

In the specific, non-limiting example where two video streams 30 are present in the system 300, the error variance of each stream after reconstruction by respective stream reconstruction component(s) 220 can be respectively expressed as $\sigma_1^2 = E[e_1^2]$ and $\sigma_2^2 = E[e_2^2]$. Further, the error correlation coefficient between the two reconstructed streams can be expressed as $\rho = E[e_1 e_2]/\sigma_1 \sigma_2$. Based on these definitions, a set of weights W can be determined by the joint decoding component 310 as follows:

$$W = \left( \frac{\sigma_2^2 - \sigma_1 \sigma_2 \rho}{\sigma_1^2 + \sigma_2^2 - 2\sigma_1 \sigma_2 \rho}, \frac{\sigma_1^2 - \sigma_1 \sigma_2 \rho}{\sigma_1^2 + \sigma_2^2 - 2\sigma_1 \sigma_2 \rho} \right), \quad (19)$$

where the error variances $\sigma_1$ and $\sigma_2$ of each DCT coefficient can be calculated with respect to Equations (15) and (16). In one example, the error correlation $\rho$ can be obtained by simulation.

When two video signals 30 are present and optimal weights W are utilized by the joint decoding component 310, the expected mean square error of the LSE estimation performed by the joint decoding component 310 can be expressed as follows:

$$E[(x - x_{LSE})^2] = \frac{\sigma_1^2 \sigma_2^2 (1 - \rho^2)}{\sigma_1^2 + \sigma_2^2 - 2\sigma_1 \sigma_2 \rho}. \quad (20)$$

By way of another specific, non-limiting example, the joint reconstruction component 22 can be used to reconstruct a video signal from multiple video streams 30 that are compressed using the H.263 codec. As the H.263 codec utilizes 8×8 blocks, a stream reconstruction component 220 at the joint reconstruction component 22 can reconstruct a given video stream 30 by collecting statistics for each of the 64 corresponding DCT coefficients in each present inter-coded and intra-coded block in the video stream 30. By doing so, the rate parameters for coefficient distribution can be obtained by observing the video streams 30. For example, when an I-frame is decoded, rate parameters for the coefficients of corresponding intra-coded blocks can be estimated as described supra with regard to Equation (8). Additionally, when a P-frame is decoded, rate parameters for the coefficients of inter-coded blocks in the following P-frame can be estimated as described supra with regard to Equations (10) and (11).

Next, given the DCT distribution, MMSE decoding can be performed for each present video stream 30 in the DCT domain by respective stream reconstruction component(s) 220 as described supra with regard to Equations (12)-(14). In one example, this process can be embedded into the decoding process after dequantization of the image and/or residue for I-blocks and/or P-blocks but before an IDCT 226 is performed. This process can include calculating an MMSE estimate for each coefficient and its corresponding MSE and then computing a LSE joint estimate of the respective coefficients via the joint decoding component 310. An IDCT 226 can then be performed on the LSE-estimated coefficients to obtain an enhanced video reconstruction.

In an additional example, operation of the joint reconstruction component 22 can be further simplified by performing LSE decoding only on the first few DCT coefficients of respective reconstructed blocks due to the fact that the power of respective high frequency DCT coefficients is relatively small as compared to the power of lower frequency DCT coefficients. By way of specific, non-limiting example, coefficients for each DCT block can be LSE decoded by the joint decoding component 310 in zigzag order. When the power of a coefficient is less than the expected MSE of the MMSE estimation, LSE decoding for the block can be terminated. By performing decoding in this manner, sufficient performance can be obtained by performing LSE decoding on approximately 20% of the coefficients present in the video streams 30.

Figure 4:
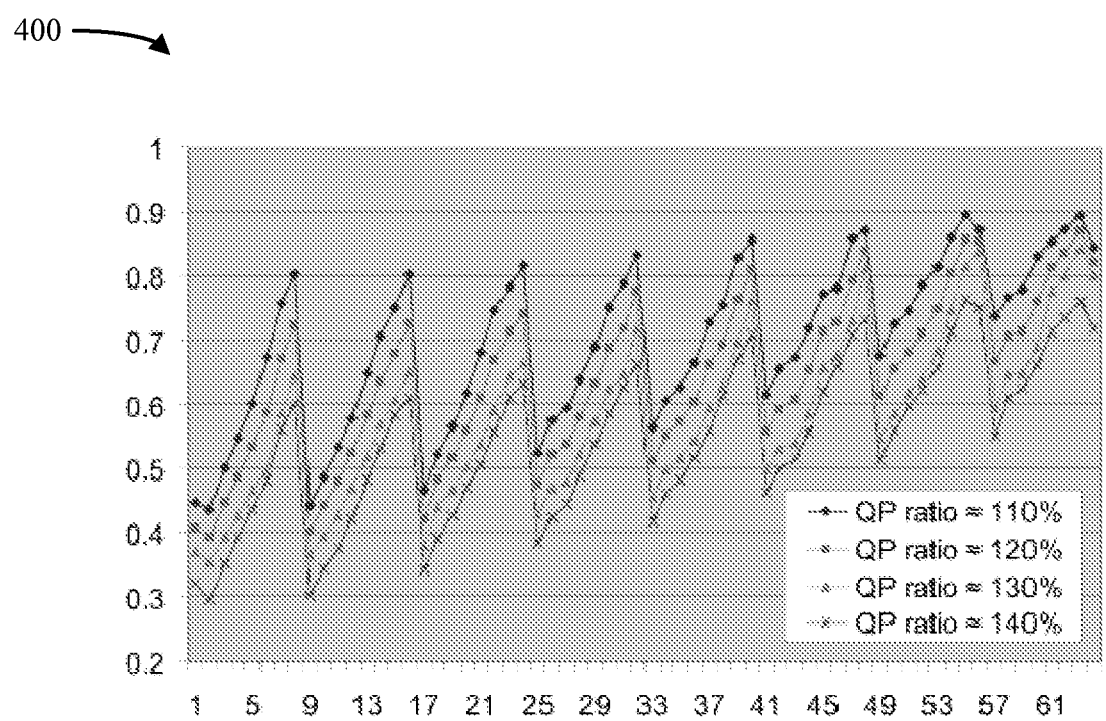
FIG. 4 illustrates error correlation data for an example video decoding system in accordance with various aspects.

Referring next to FIG. 4, a graph 400 is provided that illustrates error correlation data for an example video decoding system in accordance with various aspects described herein. More particularly, graph 400 illustrates example error correlation coefficients $\rho$ between two reconstructed video streams $(V_1, V_2)$ with different quantization steps $(Q_{p1}, Q_{p2})$. If reconstructions $V_1$ and $V_2$ are inter-coded, it can be observed from Equation (10) that $\rho$ can be a function of the ratio of $Q_{p1}/Q_{p2}$ and the residual covariance of the two video streams, which can be expressed as $(E[r_i(F_k, V_1) \cdot r_i(F_k, V_2)])$.

In one example, representative error correlation coefficients $\rho$ can be obtained by fixing the ratio $Q_{p1}/Q_{p2}$ and measuring $\rho$ in various simulation sequences. The simulation results can then be averaged to obtain coefficients $\rho$ as a function of quantization step ratio. Graph 400 illustrates resulting values of $\rho$ for each of the 64 DCT coefficients present in blocks of various simulation sequences in scanning order for 4 different quantization step ratios. It should be appreciated that while $\rho$ is approximated in graph 400, the approximations used are nonetheless accurate due to the slow variation of $\rho$. It can additionally be seen from graph 400 that the error correlations obtained for lower-frequency coefficients are smaller than those obtained for higher-frequency coefficients.

In another specific example, if two reconstructed video streams are both intra-coded, it can be observed from Equation (7) that the corresponding $\rho$ can be a function of $Q_{p1}/Q_{p2}$ and the distribution of $x_i(F_k)$. As a result, the error correlation coefficients $\rho$ for such a case can be estimated in a similar manner to that illustrated by graph 400. In yet another specific example, reconstructed signals coded with different modes, e.g. an intra-coded $V_1$ and an inter-coded $V_2$, can have an error correlation coefficient of $\rho=0$ as the signal is independent before quantization.

Figure 5:
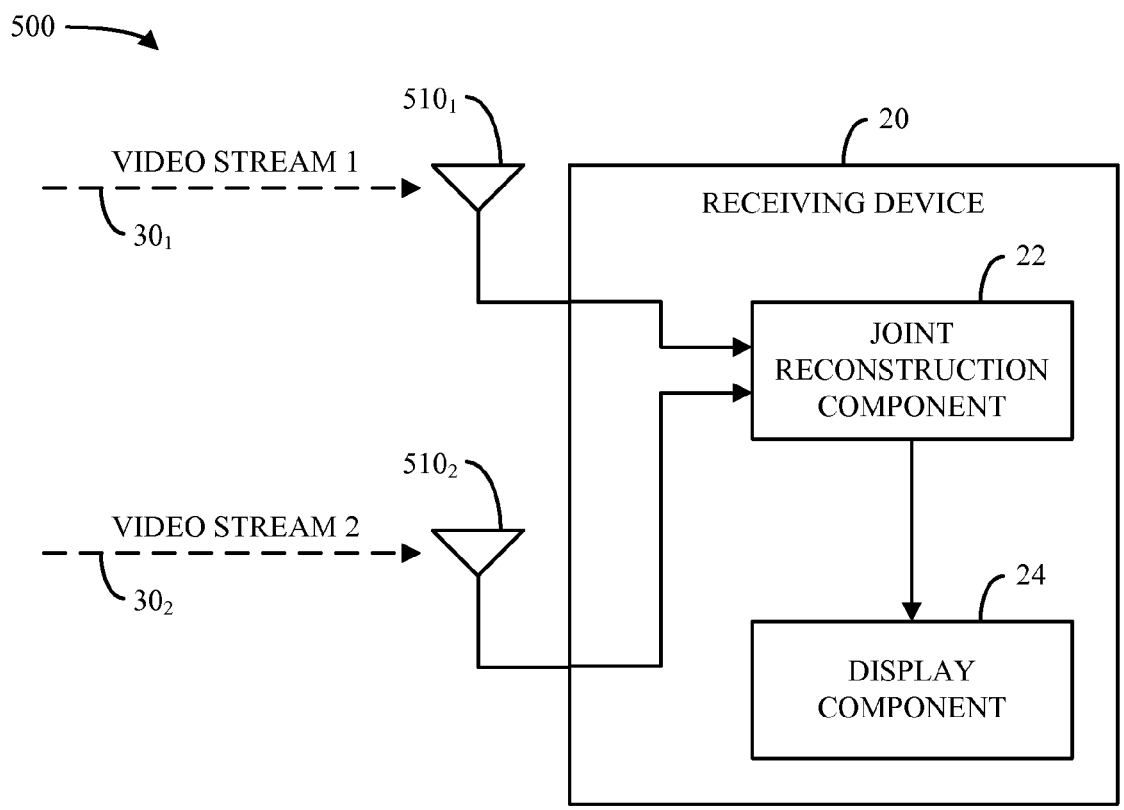
FIG. 5 is a block diagram of an example system for receiving and processing video streams in accordance with various aspects.

Referring to FIG. 5, a block diagram of an example system 500 for receiving and processing video streams 30 is illustrated. In accordance with one aspect, system 500 can include a receiving device 20, to which multiple video streams 30 can be transmitted (e.g., by a distributing device 10). In one example, the video streams 30 are generated (e.g., by a compression component 12) from a common video signal using different bit rates. The receiving device 20 can include a joint reconstruction component 22 and/or a display component 24, each of which can operate in accordance with various aspects described herein.

In one example, the receiving device 20 can include one or more antennas 510, each of which can receive one or more video streams 30. In accordance with one aspect, respective video streams 30 received by antenna(s) 510 at the receiving device 20 can be provided to a joint reconstruction component 22 at the receiving device 20. While only two video streams 30 and two antennas 510 are illustrated for brevity, it should be appreciated that system 500 can include any number of video streams 30 and/or antennas 510. By way of specific, non-limiting example, the receiving device 20 can be a mobile telephone or similar device that employs one or more antennas 510 for receiving video streams 30 from a wireless access point and/or another appropriate transmitting entity.

Additionally and/or alternatively, the number of video streams 30 transmitted to the receiving device 20 may be greater than the number of antennas 510 present at the receiving device 20. Accordingly, antenna(s) 510 at the receiving device 20 can respectively be configured to receive multiple video streams 30. For example, an antenna 510 at the receiving device 20 can receive multiple video streams 30 sequentially in time, or alternatively an antenna 510 can receive a plurality of multiplexed video streams 30 simultaneously (e.g. based on code division multiplexing (CDM), frequency division multiplexing (FDM), and/or another appropriate multiplexing technique). In one example, to facilitate sequential and/or multiplexed reception and processing of video streams 30, the joint reconstruction component 22 can employ various buffering and/or storage mechanisms. In another example, system 500 can include multiple receiving devices 20 having one or more antennas 510, and each receiving device 20 can be configured to receive only a subset of available video streams 30. For example, a first receiving device 20 can be configured to receive only a first video stream 30 having a first bit rate, and a second receiving device 20 can be configured to receive only a second video stream 30 having a second bit rate. Such a scenario can occur, for example, due to variations in the communication capabilities of the receiving devices 20, variations in network conditions between the receiving devices 20 and a transmitting entity, and/or other factors. In such an example, antennas 510 located at each receiving device 20 can be operable both to receive video streams 30 and to communicate received video streams 30 to other receiving devices 20 to facilitate joint reconstruction of the video streams in accordance with various aspects described herein.

Figure 6:
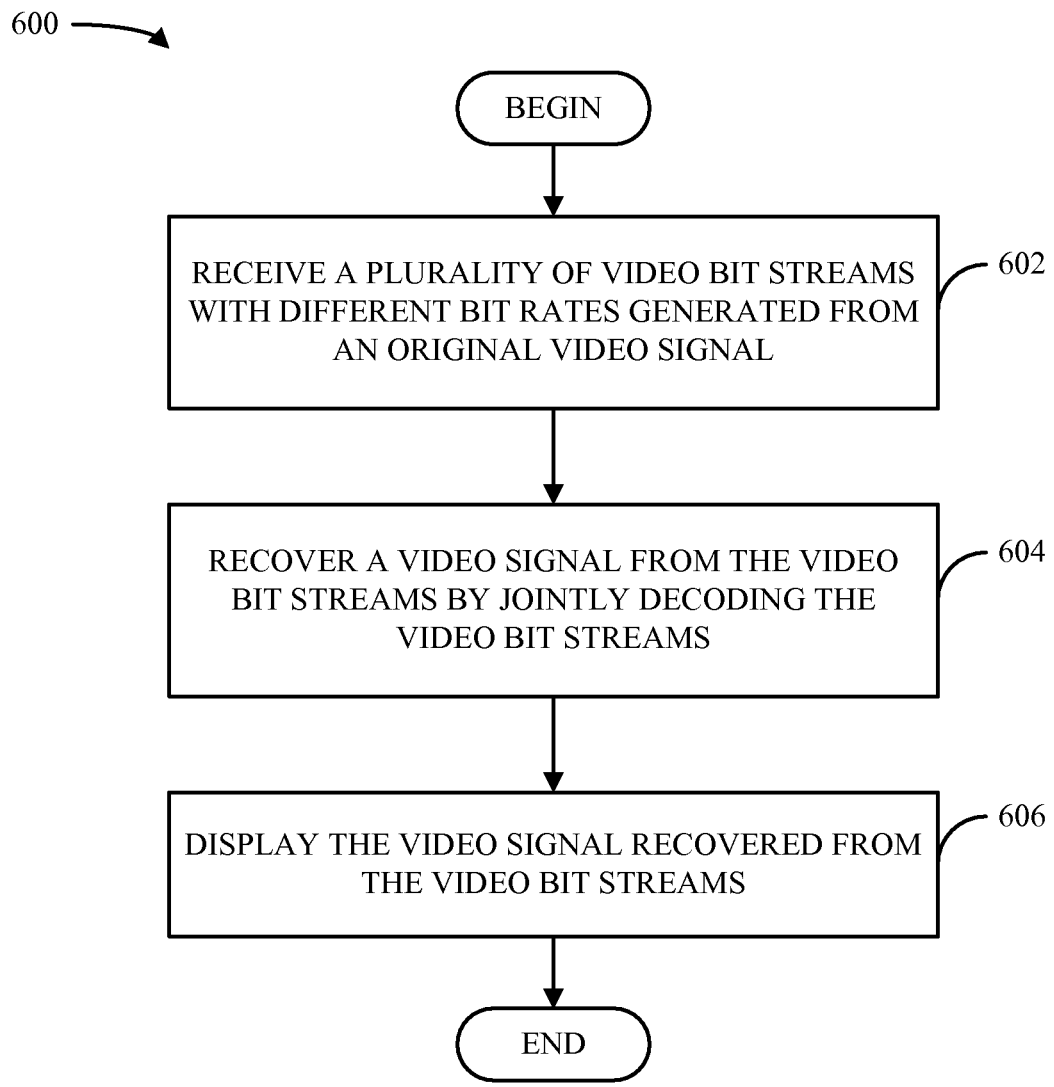
FIG. 6 is a flowchart of a method for processing video bit streams.
Figure 7:
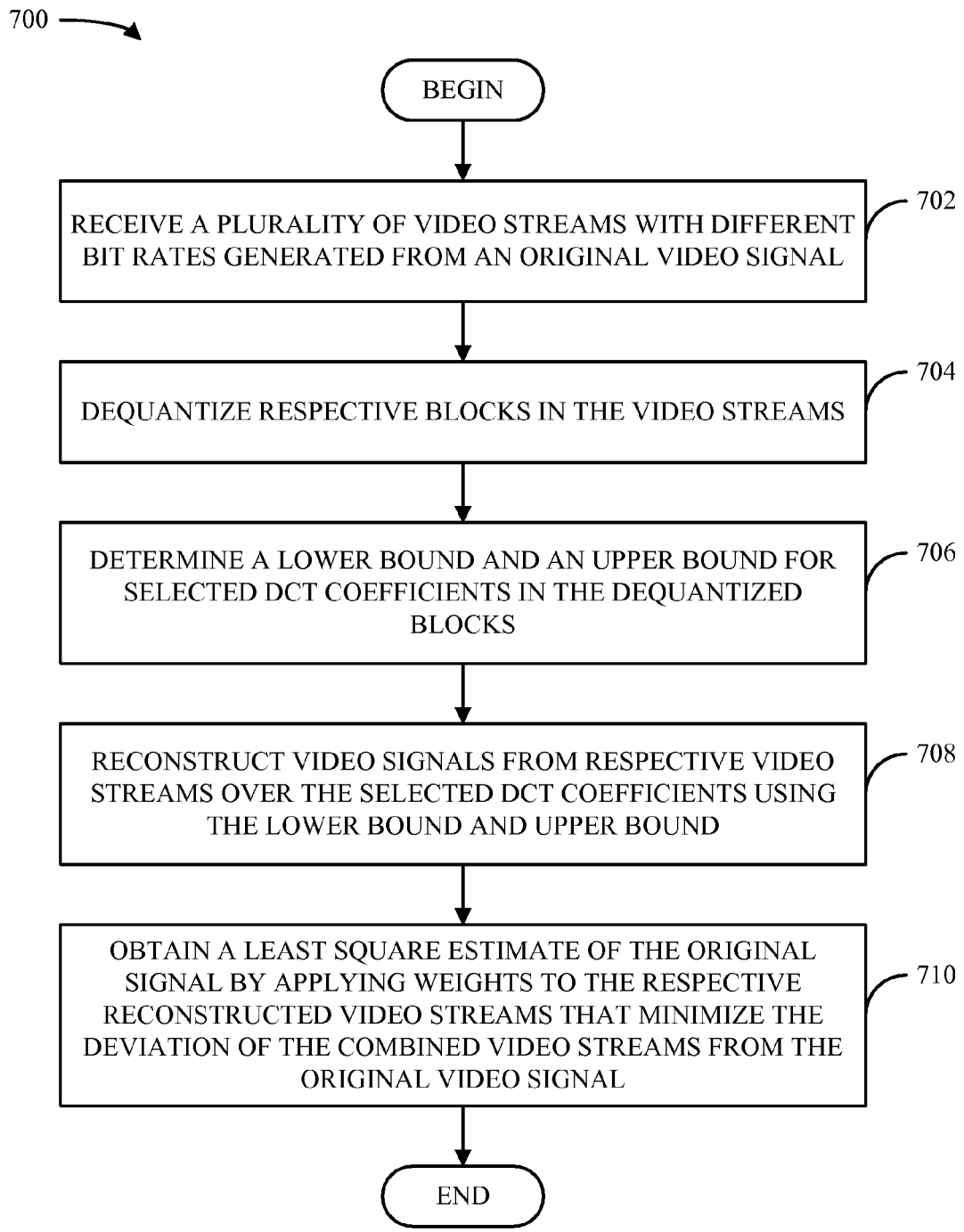
FIG. 7 is a flowchart of a method for reconstructing a video signal from multiple video bit streams.

Referring now to FIGS. 6-7, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring to FIG. 6, a method 600 of processing video bit streams (e.g. video streams 30) in accordance with various aspects is illustrated. At 602, a plurality of video bit streams generated from a common original video signal (e.g., by a compression component 12) are received (e.g., at a receiving device 20 from a distributing device 10). At 604, a video signal is recovered from the video bit streams (e.g., by a joint reconstruction component 22) by jointly decoding the video bit streams. At 606, the video signal recovered at 604 is displayed (e.g., by a display component 24).

Turning to FIG. 7, a method 700 of reconstructing a video signal from multiple video bit streams is illustrated. At 702, a plurality of video bit streams generated from a common original video signal are received. At 704, respective blocks present in the video streams received at 702 are dequantized (e.g. by a dequantizer 222). At 706, a lower bound and an upper bound are determined for selected DCT coefficients in the blocks dequantized at 704. At 708, video signals are reconstructed (e.g., by estimation components 224 at respective stream reconstruction components 220) from respective video streams over the selected DCT coefficients using the lower and upper bounds determined at 706. Finally, at 710, a least square estimate of the original video signal from which the video bit streams were generated at 702 is obtained by applying weights to respective reconstructed video streams that minimize the deviation of the combined video streams from the original video signal.

Figure 8:
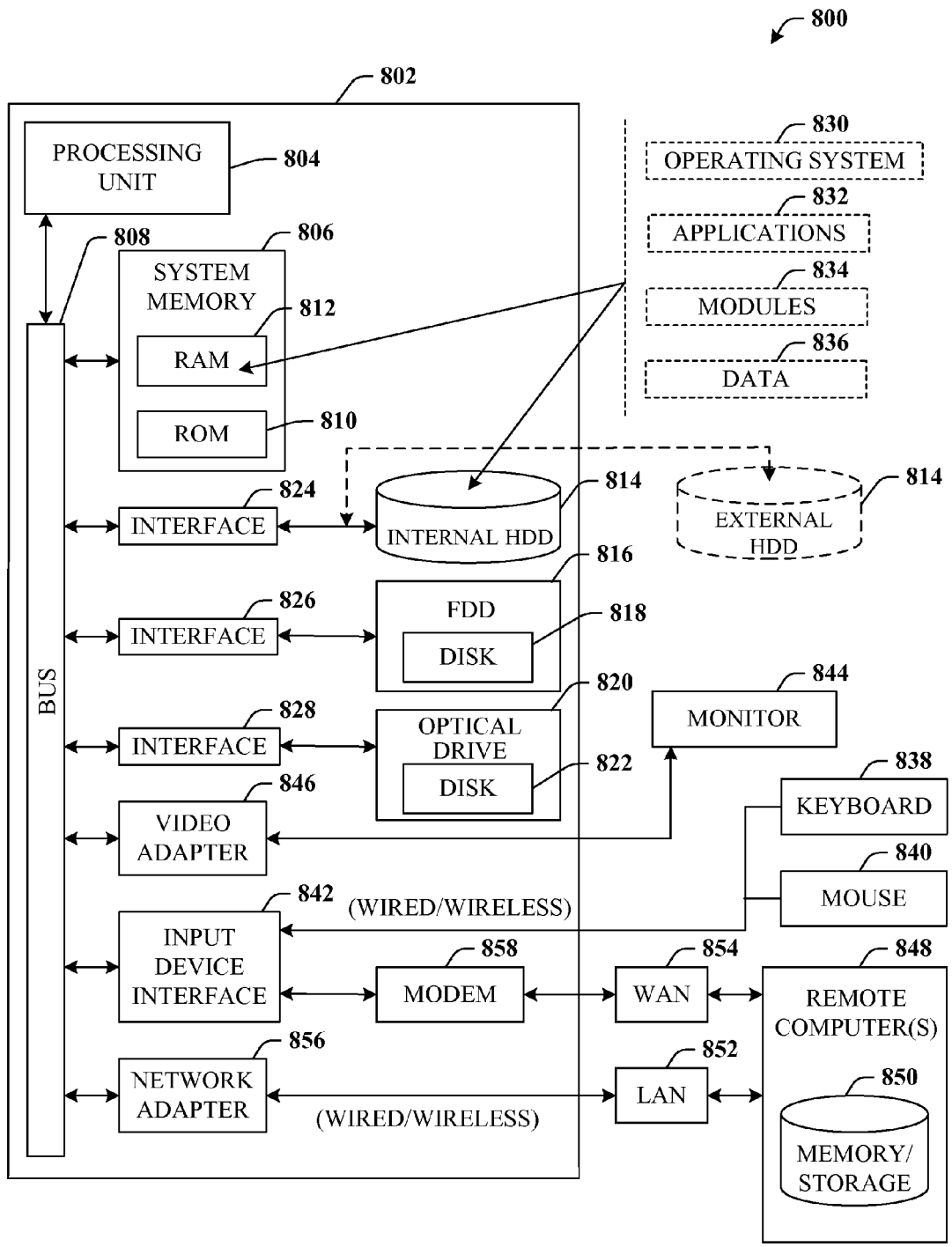
FIG. 8 is a block diagram of an example operating environment in which various aspects described herein can function.

In order to provide additional context for various aspects described herein, FIG. 8 and the following discussion are intended to provide a brief, general description of a suitable computing environment 800 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, an exemplary environment 800 for implementing various aspects described herein includes a computer 802, the computer 802 including a processing unit 804, a system memory 806 and a system bus 808. The system bus 808 couples to system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the claimed subject matter can be implemented with various commercially available operating systems or combinations of operating systems.

A user can enter commands and information into the computer 802 through one or more wired/wireless input devices, e.g. a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, a serial port, an IEEE-1394 port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g. a wide area network (WAN) 854. Such LAN and WAN networking environments are commonplace in offices and companies, and facilitate enterprise-wide computer networks, such as intranets, all of which may connect to a global communications network, e.g. the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

Figure 9:
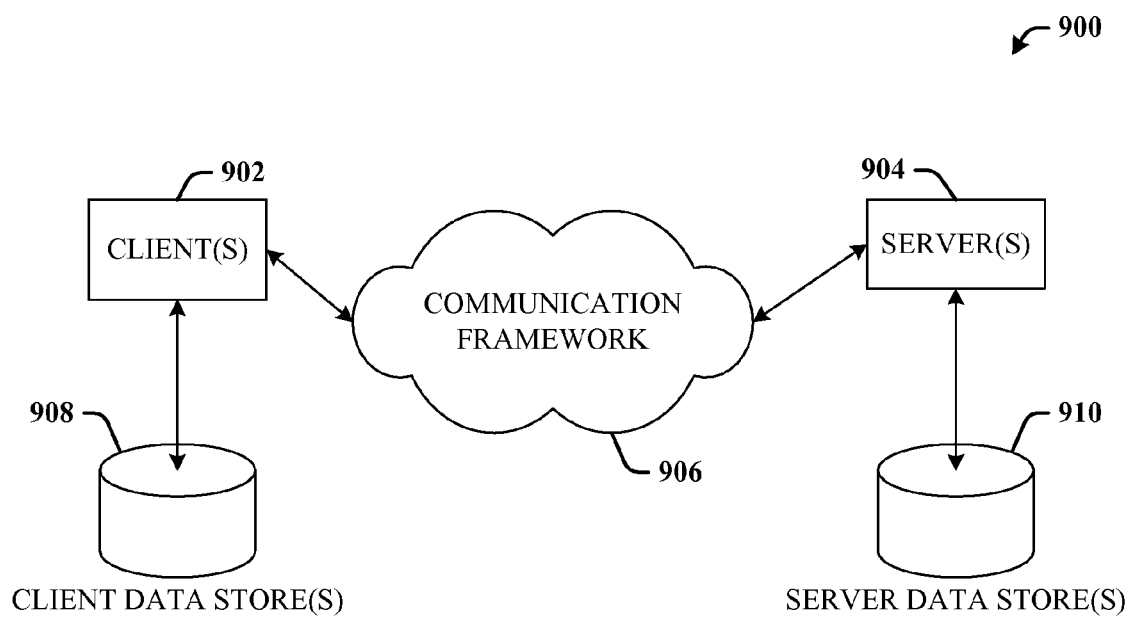
FIG. 9 is a block diagram of an example networked computing environment in which various aspects described herein can function.

Referring now to FIG. 9, a schematic block diagram of an example networked computing environment in which various aspects described herein can function is illustrated. The system 900 includes one or more client(s) 902, which can be hardware and/or software (e.g., threads, processes, computing devices). In one example, the client(s) 902 can house cookie(s) and/or associated contextual information.

The system 900 can additionally include one or more server(s) 904, which can also be hardware and/or software (e.g. threads, processes, computing devices). In one example, the servers 904 can house threads to perform one or more transformations. One possible communication between a client 902 and a server 904 can be in the form of a data packet adapted to be transmitted between two or more computer processes. The data packet can include, for example, a cookie and/or associated contextual information. The system 900 can further include a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g. hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g. according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A system, comprising:
a joint reconstruction component that reconstructs a common original video signal from respective video streams encoded at disparate bit rates from the common original video signal based at least in part on a decoding that employs a least squares estimation, the joint reconstruction component comprising:
one or more stream reconstruction components that reconstruct video signal information corresponding to the respective video streams, wherein the one or more stream reconstruction components further comprise respective estimation components that determine respective ranges of discrete cosine transform coefficients for the respective video streams, and select values for the discrete cosine transform coefficients for the respective video streams from the respective ranges based on a probability distribution for the discrete cosine transform coefficients; and
a joint decoding component that creates a reconstructed video signal at least in part by determining weight values for the video signal information corresponding to the respective video streams to reduce a distortion between the common original video signal and the reconstructed video signal.

2. The system of claim 1, wherein the respective video streams are frequency domain video streams respectively comprising the discrete cosine transform coefficients.

3. The system of claim 2, wherein the joint reconstruction component reconstructs the common original video signal in a frequency domain, and converts the common original video signal reconstructed by the joint reconstruction component to a time domain video signal by performing an inverse discrete cosine transform.

4. The system of claim 3, further comprising a display component that displays the common original video signal reconstructed by the joint reconstruction component.

5. The system of claim 1, wherein the respective video streams are quantized based on the bit rates for the respective video streams, and the one or more stream reconstruction components comprise respective one or more dequantizers that dequantize the respective video streams based on the bit rates of the respective video streams.

6. The system of claim 1, wherein the one or more stream reconstruction components select the values for the discrete cosine transform coefficients to minimize or substantially minimize a minimum mean square error of the reconstructed video signal in relation to the common original video signal.

7. The system of claim 1, wherein the joint decoding component further combines the reconstructed video signal information based on the weight values.

8. The system of claim 1, further comprising one or more antennas that receive the respective video streams.

9. A method, comprising:
decoding respective video bit streams resulting in decoded video bit streams, wherein the video bit streams originate from a common original video signal and are encoded at different bit rates; and
recovering the common original video signal at least in part by jointly analyzing the decoded video bit streams to obtain a least square estimate of the common original video signal, wherein the recovering comprises:
determining a lower bound and an upper bound for selected discrete cosine transform coefficients in respective blocks in the decoded video bit streams;
applying weight values to the decoded video bit streams, wherein the weight values are based on a deviation between the common original video signal and the decoded video bit streams; and
obtaining a reconstruction of the common original video signal for the selected discrete cosine transform coefficients based at least in part on the lower bound, the upper bound, a probability distribution for the selected discrete cosine transform coefficients, and the weight values.

10. The method of claim 9, further comprising:
receiving the respective video bit streams as a plurality of frequency-domain video bit streams; and
converting the respective video bit streams to a frequency domain representation based on a discrete cosine transform.

11. The method of claim 10, wherein the respective video bit streams comprise respective blocks having a predetermined number of discrete cosine transform coefficients.

12. The method of claim 11, further comprising quantizing the respective blocks using quantization steps, wherein the quantization steps are based on the bit rates of the respective video bit streams.

13. The method of claim 12, wherein the decoding comprises dequantizing the respective blocks in the respective video bit streams based on the quantization steps.

14. The method of claim 9, wherein the applying the weight values yields weighted video bit streams, and the method further comprises
combining the decoded video bit streams and the weighted video bit streams to obtain a recovered video signal.

15. The method of claim 14, further comprising obtaining a time-domain recovered video signal by performing an inverse discrete cosine transform on the recovered video signal.

16. A computer-readable storage device having stored thereon computer-executable instructions that, in response to execution, cause a computer system including a processor to perform operations, comprising:
decoding respective video bit streams to yield decoded video bit streams, wherein the video bit streams originate from a common original video signal and are encoded at different bit rates; and
recovering the common original video signal at least in part by jointly analyzing the decoded video bit streams to obtain a least square estimate of the common original video signal, wherein the recovering comprises:
determining a lower bound and an upper bound for selected discrete cosine transform coefficients in respective blocks in the decoded video bit streams;
associating weight values to the decoded video bit streams, wherein the weight values are determined based on a deviation between the common original video signal and the decoded video bit streams; and
obtaining a reconstruction of the common original video signal for the selected discrete cosine transform coefficients based at least in part on the lower bound, the upper bound, a probability distribution for the selected discrete cosine transform coefficients, and the weight values.

17. The computer-readable storage device of claim 16, wherein the operations further comprise receiving the respective video bit streams as a plurality of frequency-domain video bit streams, wherein the respective video bit streams are converted to a frequency-domain representation based on a discrete cosine transform.

18. A system, comprising:
means for jointly decoding a plurality of data streams having different bit rates to reconstruct an original video sequence at least in part by obtaining a least square estimate of the original video sequence from the plurality of data streams; and means for reconstructing data signal information corresponding to the plurality of data streams, wherein the means for reconstructing comprises:

means for determining reconstructed discrete cosine transform coefficients for the plurality of data streams at least in part by determining upper bounds and lower bounds for respective discrete cosine transform coefficients of the plurality of data streams;

means for selecting values for the respective discrete cosine transform coefficients from respective ranges defined by the upper bounds and lower bounds based on a probability distribution for the discreet cosine transform coefficients; and means for generating a reconstructed video signal by determining weight values for the data signal information corresponding to the plurality of data streams based on a deviation between the original video signal and the reconstructed video signal.

19. The system of claim 18, further comprising means for obtaining a frequency-domain reconstruction of the original video sequence for the values of the respective discrete cosine transform coefficients.

* * * * *